United States Patent [19]

Suzuki et al.

[11] 4,382,917

[45] May 10, 1983

[54] PROCESS FOR PREPARING CADMIUM SULFIDE FOR ELECTROPHOTOGRAPHY AND PRODUCT THEREOF

[75] Inventors: Kiyoshi Suzuki, Yokohama; Hirokuni Kawashima, Tokyo, both of Japan

[73] Assignee: Canon Kabushiki Kaisha, Tokyo, Japan

[21] Appl. No.: 219,482

[22] Filed: Dec. 23, 1980

[30] Foreign Application Priority Data

Dec. 28, 1979 [JP] Japan ............................... 54-171356

[51] Int. Cl.³ ...................... C01B 17/00; C09K 11/10; H01L 31/00; H01B 1/06
[52] U.S. Cl. .......................... 423/561 B; 252/301.6 S; 252/501.1; 430/94
[58] Field of Search ............. 423/561 B; 252/301.6 S, 252/501.1; 430/94

[56] References Cited

U.S. PATENT DOCUMENTS

| 2,578,363 | 12/1951 | Marcot | 423/561 B |
| 3,432,262 | 3/1969 | Ravich | 423/561 B |
| 3,706,673 | 12/1972 | Waiwer | 423/561 B |
| 3,852,404 | 12/1974 | Daly | 423/561 B |
| 3,895,943 | 7/1975 | Hanada et al. | 423/561 B |
| 4,090,983 | 5/1978 | Akaoka | 423/561 B |
| 4,254,093 | 3/1981 | Faria et al. | 252/501.1 |

FOREIGN PATENT DOCUMENTS

| 1388522 | 4/1964 | France | 423/561 B |
| 37-14055 | 9/1962 | Japan | 423/561 B |
| 191506 | 1/1967 | U.S.S.R. | 423/561 B |
| 498601 | 1/1976 | U.S.S.R. | 430/94 |

*Primary Examiner*—Gary P. Straub
*Attorney, Agent, or Firm*—Fitzpatrick, Cella, Harper & Scinto

[57] ABSTRACT

Cadmium sulfide particles are heated in a solution of a compound capable of generating sulfur when heated. The cadmium sulfide thus treated is suitable for a photoconductive material for electrophotography.

3 Claims, 1 Drawing Figure

PROCESS FOR PREPARING CADMIUM SULFIDE FOR ELECTROPHOTOGRAPHY AND PRODUCT THEREOF

BACKGROUND OF THE INVENTION

1. Field of the Invention

The present invention relates to a process for preparing cadmium sulfide for electrophotography and the cadmium sulfide thus produced.

2. Description of the Prior Art

Various electrophotographic photosensitive members are known. Representative electrophotographic photosensitive members are a photosensitive member composed of a support member and a photoconductive layer and a photosensitive member composed of a support member, a photoconductive layer overlying the support member and an insulating layer overlying the photoconductive layer.

The former is widely used for most popular electrophotographic processes comprising charging, imagewise exposure and development, and if desired, additionally transferring the developed images to image receiving members.

The insulating layer in the latter is provided for the purpose of protecting the photoconductive layer, improving mechanical strength of the photosensitive member, improving dark decay characteristics, using the photosensitive member for a particular electrophotographic process, or preventing pollution.

Representative electrophotographic photosensitive members of the latter type and process employing said members are shown, for example, in U.S. Pat. No. 2,860,048, Japanese Patent Publication No. 16429/1966, Japanese Patent Publication No. 15446/1963 (U.S. Pat. No. 3,146,145), Japanese Patent Publication No. 3713/1971 (U.S. Pat. No. 3,607,258), Japanese Patent Publication No. 23910/1967 (U.S. Pat. No. 3,666,363), Japanese Patent Publication No. 24748/1968 (U.S. Pat. No. 3,734,609), Japanese Patent Publication No. 19747/1967 (U.S. Pat. No. 3,457,070), and Japanese Patent Publication No. 4121/1961 (U.S. Pat. No. 3,124,456).

One important factor affecting characteristics of electrophotographic photosensitive members is the photoconductive material. Cadmium sulfide particles is often used as a photoconductive material for electrophotographic photosensitive members. Cadmium sulfide particles possessing desired characteristics may be produced by appropriately controlling amount of doping impurities, conditions for precipitation, firing conditions for diffusing impurities further, and post-treatment conditions.

Electric resistance of photosensitive member comprising cadmium sulfide is affected by the storing conditions of the photosensitive member, that is, whether the photosensitive member is exposed to light or not, and further photodecay properties of the photosensitive member are also varied.

Such changes of electrophotographic characteristics of photoconductive layers attributable to the difference in the storing conditions adversely affect the formation of stable images. In other words, when a photosensitive member has been stood in the dark and then used for copying, for example, a copying machine is not used for a long period of time and then, is operated to produce copies, the resulting image quality at the beginning of copying is different from the image quality obtained by using a photosensitive member which has been stood at a light place, for example, a copying machine is operated for a short time to produce a number of copied sheets and then a copy is made by the copying machine. As the result, it is not possible to produce images of a uniform image quality. Therefore, it is desired to produce images stably without variation of image quality regardless of difference in storing conditions.

As the result of recent improvement in electrophotographic techniques, copying speed has been is increased to a great extent and therefore, it is required that photodecay of photosensitive members is very rapid. For example, it is required that any effect of projection of light in the first cycle of an image forming process comprising imagewise exposure, blanket exposure, and pre-exposure to eliminate the previously formed electrostatic latent images does not remain upon carrying out the second cycle.

In the case of cadmium sulfide used for electrophotographic photosensitive members, the stable formability of images of uniform quality and speed characteristic of photodecay are liable to be lowered when heated at a temperature higher than 100° C.

For example, when cadmium sulfide is dispersed in a thermosetting resin binder followed by thermosetting to produce a photoconductive layer or further an insulating layer is formed on the photoconductive layer by thermosetting and drying, the stable formability of images of uniform quality and speed characteristic are deteriorated by the heat applied.

The deterioration appears to be due to change of Cd-S bond on the particle surface of cadmium sulfide caused by heat and the resulting surface defects.

U.S. Pat. No. 2,876,202 discloses a method for preparing cadmium sulfide for photocell which comprises firing CdS in sulfur gas. However, the reaction efficiency of sulfur with CdS is poor and it is difficult to quantitatively bring sulfur into contact with cadmium sulfide. Therefore, excess or less sulfur is attached to cadmium so that it is difficult to obtain desired characteristics of cadmium sulfide and further sulfur gas is often reacted with oxygen to form sulfur dioxide which adversely affects cadmium sulfide.

SUMMARY OF THE INVENTION

An object of the present invention is to provide a process for preparing cadmium sulfide for electrophotography free from deterioration of stable formability of images of uniform image quality and speed characteristic of photodecay.

Another object of the present invention is to provide a process for preparing cadmium sulfide for electrophotographic photosensitive members suitable for high speed copying.

A further object of the present invention is to provide cadmium sulfide produced by such process as mentioned above.

According to one aspect of the present invention, there is provided a process for preparing a cadmium sulfide for an electrophotographic photosensitive member characterized in that cadmium sulfide particles are heated in a solution of a compound capable of generating sulfur when heated.

According another aspect of the present invention, there is provided a product produced by the above mentioned process.

DESCRIPTION OF THE PREFERRED EMBODIMENTS

Figure 1:
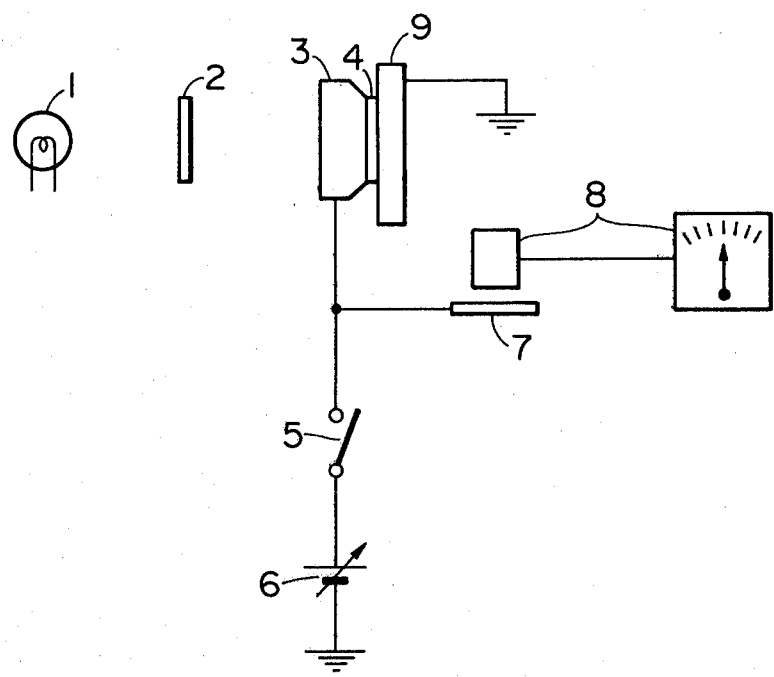
FIG. 1 shows a device for measuring photosensitive characteristics of an electrophotographic photosensitive member.

Cadmium sulfide generally prepared for electrophotography may be used as the cadmium sulfide which is subjected to heat-treatment in the solution of the compound capable of generating sulfur when heated according to the present invention.

For example, there are used cadmium sulfide prepared by a process in which $H_2S$ gas is bubbled into aqueous solution of a water-soluble cadmium salt such as $CdSO_4$ and the like containing impurity of donor and acceptor to precipitate CdS, and the CdS thus prepared is baked; cadmium sulfide prepared by a process in which $H_2S$ gas is bubbled into aqueous solution of a water soluble cadmium salt to obtain pure CdS, and the necessary impurity, a flux, and the like are added to the CdS thus prepared, then the obtained mixture is baked; and commercially available CdS for photoconductive materials.

As a sulfur-containing compound which generates S by heating, there may be used any compound which generates S in hot water. Thiourea, sodium thiosulfate, potassium thiosulfate, thioacetic acid, potassium trithiocarbonate and the like are preferably used.

An amount of a sulfur-containing compound to be added is required to be determined by presumption of characteristics of the CdS prepared according to the producing conditions, and is generally $10^{-4} - 10^{-1}$ mole, preferably $10^{-3} - 10^{-1}$ mole per one mole of the prepared Cds.

Since the effect of a sulfur-containing compound increases remarkably in an acidic solution, it is more effective to acidify the treating solution by addition of acid. In this case, preferable result is obtained by treatment in the pH range of 1-4.

After heat-treatment with a sulfur-containing compound, the obtained CdS is washed with water. For complete washing, impurity ions may be removed with deionized water, if necessary. The CdS thus obtained is free from decreasing of electric resistance and degradation of photodecay characteristics when it is heated. Further the electrophotographic photosensitive member made of the foregoing CdS is free from degradation of characteristics of an electrophotographic photosensitive member at circumambient temperatures and degradation of characteristics under high humidity.

EXAMPLE 1

Starting materials were $CdSO_4$ and $CuSO_4$. $H_2S$ gas was bubbled into an aqueous solution comprising cadmium sulfate, copper sulfate, sulfuric acid, and hydrochloric acid to precipitate cadmium sulfide.

After baking 100 g of the cadmium sulfide thus obtained, the baked cadmium sulfide was placed in a five liter beaker and two liters of pure water was added to break the cadmium sulfide into pieces. Thereafter, sodium thiosulfate was added to the dispersion liquid in an amount of $10^{-2}$ mole per one mode of the cadmium sulfide and sulfuric acid was added to the dispersion liquid to adjust the pH to 2. The dispersion liquid was boiled for 30 minutes, cooled, and washed with pure water until the conductivity of the supernatant liquid was brought to less than 10 micro volt/cm. Thereafter, an ion-exchange resin (a mixture of an anion- and a cation-exchange resins) was added to the dispersion liquid and the liquid was stirred for one and half hours. After separation of the ion exchange resin from the dispersion liquid by a screen of 100 mesh, the cadmium sulfide was filtered off followed by heating at 60° C. overnight.

After the cadmium sulfide thus prepared was uniformly mixed with and dispersed in CBR resin (cyclobutadiene rubber, supplied by Japan Synthetic Rubber Co., Ltd), the resulting mixture was coated in the thickness of about 40 microns on an aluminum substrate. The resulting photosensitive plate was heated at 180° C. to cure the resin. Thereafter, a polyester film of 25 microns thick was adhered to the photosensitive plate to produce a three-layered electrophotographic photosensitive member.

EXAMPLE 2

A cadmium sulfide modified according to the present invention was prepared by a similar procedure to Example 1 except that thiourea was added to the dispersion liquid in an amount of $2 \times 10^{-2}$ mole per one mole of the cadmium sulfide and sulfuric acid was added to the mixture to adjust the mixture to pH 3. A three-layered electrophotographic photosensitive member was produced by use of the resulting cadmium sulfide.

COMPARATIVE EXAMPLE 1

A cadmium sulfide was treated by a similar procedure to Example 1 except that the mixture was boiled without additives.

Thereafter, a three-layered electrophotographic photosensitive member was produced by use of the resulting cadmium sulfide.

Two samples of a photosensitive member for each of Example 1, Example 2 and Comparative Example 1 were prepared. One was allowed to stand in a light place and the other in a dark place, and these were measured as follows.

The measurement was carried out by the device illustrated in FIG. 1.

A glass plate 3 having a transparent electrode 4 was pressed to the surface of an insulating layer of a photosensitive member 9. Transparent electrode 4 was connected to a high voltage DC power source 6 through a relay switch 5. Relay switch 5 was closed to apply a high voltage (Va) for 0.2 sec., and then stood open for 0.2 sec. followed by the irradiation for 0.2 sec. again. The change of voltage (Vp) was measured by means of a surface potentiometer 8 and a metal plate of the same voltage as the photosensitive member. "Vp" is a voltage applied to a photoconductive layer.

A shutter was opened to irradiate the photosensitive member with white light from a halogen lamp 1 for 0.2 sec. so as to conduct preliminary exposure, and after standing for 0.2 sec., Va was applied, and after standing for 0.2 sec., the the irradiation was carried out for 0.2 sec. again. The change of voltage (Vp') was measured by the foregoing method.

Vp and Vp' when Va was $-2000$ V, and Vp when Va was $+2000$ V were measured, and a speed of photodecay was determined by means of Vp-Vp' when Va applied was $-2000$ V.

Using samples stood in a light place (light place samples) and samples stood in a dark place (dark place samples) which were produced by Examples 1 and 2, and Comparative Example 1, Vp when Va was −2000 V, Vp when Va was +2000 V, and Vp-Vp' when Va was −2000 V were measured. The obtained results were listed in the following table.

| Sample | | Va: −2000V Vp (−) | Va: +2000V Vp (+) | Va: −2000V Vp − Vp' |
|---|---|---|---|---|
| Example 1 | dark place | 1080V | 900V | 180V |
| | light place | 1100V | 920V | 80V |
| Example 2 | dark place | 1050V | 850V | 150V |
| | light place | 1070V | 880V | 60V |
| Comparative Example 1 | dark place | 960V | 620V | 350V |
| | light place | 1020V | 700V | 200V |

In Examples 1 and 2, Vp (−) and Vp(+) were larger than that in Comparative Example 1. This shows that electric resistances of the electrophotographic photosensitive members in Examples 1 and 2 are higher than electric resistance in Comparative Example 1, and the differences between Vp and Vp' in Examples 1 and 2 are smaller than that in Comparative Example 1. This shows that effects of preliminary exposure in Examples 1 and 2 are smaller than that in Comparative Example 1, that is, speeds of photodecay of the electrophotographic photosensitive members in Examples 1 and 2 are higher than that in Comparative Example 1. Comparing differences between Vp-Vp' of light place samples and dark place samples, the differences in Example 1 and 2 are very smaller than the difference in Comparative Example 1. This shows that the electrophotographic members according to Examples 1 and 2 produce images having substantially stable contrast even if storage conditions are different, that is, the members are excellent in producing constantly images of uniform image quality.

When an image forming procedure based on the fundamental process comprising preliminary exposure, primary charge, AC discharge contemporaneously with exposure, and whole surface exposure was carried out by means of a copying machine, the electrophotographic photosensitive member according to Comparative Example 1 produced a thin image when the member was used after standing in a dark place for long time. However, in case that the electrophotographic photosensitive members according to Examples 1 and 2 were used, good images were lastingly obtained even after standing in a dark place.

When circumambient temperature was in the range from 30° C. to 5° C., electric resistance and image density obtained decreased with lowering temperature in case of the member in Comparative Example 1. On the contrary, electric resistance and image density were substantially unvaried in case of the members in Examples 1 and 2.

EXAMPLE 3

In two liters of pure water was placed one mole of cadmium sulfide which contains copper in an amount of $12 \times 10^{-4}$ mole/mole CdS as acceptor and chlorine in an amount of $1 \times 10^{-3}$ mole/mole Cds as donor. Sodium thiosulfate was added to the dispersion liquid in an amount of $10^{-2}$ mole and sulfuric acid was added to the mixture to adjust the dispersion liquid to pH 2.

With stirring, said dispersion liquid was heated to 80° C., then kept at that temperature for 30 minutes. After cooling, the conductivity of the supernatant liquid was 3000 micro volt/cm. After repeated washing by decantation until the conductivity of the supernatant liquid was brought to 10 micro volt/cm, impure ions remaining on the surface of the obtained particles were removed by means of ion exchange resin. Thereafter, the ion exchange resin was separated, and the cadmium sulfide was filtered off with pressure to dry at 60° C. overnight.

After the cadmium sulfide thus prepared was uniformly mixed with CBR resin (cyclobutadiene rubber, supplied by Japan Synthetic Rubber Co., Ltd.), the resulting mixture was coated in the thickness of about 40 microns on an aluminum substrate of 50 microns in thickness to produce a photoconductive layer. After curing the photoconductive layer at 180° C., a transparent polyester film of 25 microns thick as an insulating layer was adhered to the photoconductive layer to produce a three-layered electrophotographic photosensitive member.

EXAMPLE 4

A cadmium sulfide modified according to the present invention was prepared by a similar procedure to Example 1 except that $10^{-2}$ mole of thiourea was added to the dispersion liquid used in Example 3 in which one mole of cadmium sulfide was dispersed in two liters of pure water in place of sodium thiosulfate in Example 3. Thereafter, a three-layered electrophotographic photosensitive member was produced by use of the cadmium sulfide thus prepared in a similar procedure to that described in Example 1.

COMPARATIVE EXAMPLE 2

A three-layered electrophotographic photosensitive member was produced by use of the cadmium sulfide which was the starting material in Example 3 in a similar procedure to that described in Example 3.

Vp, Vp' and Va were measured with respect to the electrophotographic photosensitive members prepared in Examples 3 and 4, and Comparative Example 2 in a similar manner to that conducted with respect to the members prepared in Examples 1 and 2, and Comparative Example 1. The results are shown in the following table.

| Sample | | Va: −2000V Vp (−) | Va: +2000V Vp (+) | Va: −2000V Vp − Vp' |
|---|---|---|---|---|
| Example 3 | dark place | 1100V | 920V | 130V |
| | light place | 1130V | 950V | 60V |
| Example 4 | dark place | 1080V | 890V | 170V |
| | light place | 1100V | 900V | 90V |
| Comparative Example 5 | dark place | 960V | 620V | 350V |
| | light place | 1020V | 700V | 200V |

These results show that effects to photodecay characteristics by pre-exposure are little and photoconductive layers have high dark resistance with respect to electrophotographic photosensitive members prepared in Examples 3 and 4. When an image forming procedure based on the fundamental process comprising preliminary exposure, primary charge, AC discharge contemporaneously with imagewise-exposure, and whole surface exposure was carried out by means of a copying machine at circumambient temperature in the range from 30° C. to 5° C., electric resistance and image density obtained decreased with lowering temperature, in case of the member in Comparative Example 2. On the contrary, electric resistance and image density were substantially unvaried in case of members in Examples 3 and 4.

What we claim is:

1. A process for preparing cadmium sulfide adapted for use in an electrophotographic photosensitive member which comprises:
   (a) preparing a cadmium sulfide feed by firing precipitated cadmium sulfide containing doping impurities to enhance photoconductivity thereof,
   (b) heating said feed in a solution of a compound capable of generating sulfur when heated under conditions sufficient to generate said sulfur, and
   (c) recovering a cadmium sulfide having a photoconductivity greater than that of said cadmium sulfide feed, which exhibits rapid photodecay and uniform image quality after prolonged inactivity.

2. A process for preparing a cadmium sulfide for an electrophotographic photosensitive member according to claim 1 in which the solution of the compound capable of generating sulfur when heated is acidic.

3. A process for preparing a cadmium sulfide for an electrophotographic photosensitive member according to claim 1 in which the compound capable of generating sulfur when heated is a member selected from the group consisting of thiourea, sodium thiosulfate, potassium thiosulfate, thioacetic acid, and potassium trithiocarbonate.

* * * * *